United States Patent [19]

Gerberick

[11] Patent Number: 5,268,338
[45] Date of Patent: Dec. 7, 1993

[54] CERAMIC ADHESIVE COMPOSITION AND USE THEREOF

[75] Inventor: Wayne E. Gerberick, York, Pa.

[73] Assignee: The J.E. Baker Company, York, Pa.

[21] Appl. No.: 861,010

[22] Filed: Mar. 31, 1992

[51] Int. Cl.$^5$ .............................................. C04B 35/06
[52] U.S. Cl. .................................. 501/109; 501/121;
501/122; 501/123
[58] Field of Search ............... 501/108, 109, 121, 122,
501/123; 156/DIG. 78

[56] References Cited

U.S. PATENT DOCUMENTS

| | | | |
|---|---|---|---|
| 1,616,055 | 2/1927 | Marks | 501/109 X |
| 1,616,192 | 2/1927 | Marks | 501/109 |
| 1,653,344 | 12/1927 | Clawson | 501/109 |
| 1,912,894 | 6/1933 | Garnett | 501/109 |
| 3,414,419 | 12/1968 | Farrington, Jr. et al. | 501/109 X |
| 3,468,683 | 8/1969 | Montgomery | 501/101 |
| 3,632,360 | 1/1972 | Lufcy | 501/109 X |
| 3,634,114 | 1/1972 | Lufcy | 106/58 |
| 3,816,157 | 6/1974 | Cassens, Jr. | 501/109 X |
| 4,079,032 | 3/1978 | Zenbutsu et al. | 260/42.43 |
| 4,119,473 | 10/1978 | Lundgren et al. | 501/109 X |
| 4,473,654 | 9/1984 | Stendera | 501/108 |
| 4,549,906 | 10/1985 | Wyskott et al. | 106/16 |
| 4,703,022 | 10/1987 | Johnson | 501/95 |
| 4,981,821 | 1/1991 | Stendera et al. | 501/94 |

*Primary Examiner*—Karl Group
*Assistant Examiner*—Chris Gallo
*Attorney, Agent, or Firm*—Bacon & Thomas

[57] ABSTRACT

A refractory adhesive and filler paste composition is described which can be extruded, trowelled or parged onto a refractory surface. The composition can be used to adhesively secure shaped refractory articles together or used as a filler. The composition contains refractory grain particles having critical size limitations and a non-aqueous binder system which includes an unsaturated drying oil such as tung or linseed oil and an organic solvent such as naphtha. The composition may be premixed and packaged in a caulking gun cartridge and applied by extrusion.

14 Claims, 1 Drawing Sheet

CERAMIC ADHESIVE COMPOSITION AND USE THEREOF

BACKGROUND OF THE INVENTION

1. Field of the Invention

The present invention relates to ceramic adhesive compositions which are useful for refractory applications.

2. Background Information

Dolomite, particularly calcined dolomite (doloma), is used to make various types of refractory articles for use in a high-temperature environment such as an environment encountered in metallurgical applications. It is often desirable to secure refractory articles together. In addition, it is sometimes necessary to fill cracks, spaces, gaps and the like in a shaped refractory article and it is also sometimes necessary to patch defects which develop in refractory articles.

Refractory articles may be mechanically joined together. However, such mechanical devices for joining refractory articles are usually cumbersome to use and may not be suitable for use in a high-temperature environment. Clearly, it is desirable to provide a suitable adhesive which can be used to secure shaped refractory articles together, particularly articles made from doloma. Such an adhesive must be compatible with the doloma and should have similar physical properties, especially refractory properties. Thus, it is highly desirable to provide refractory cement which contains calcined dolomite, magnesia (MgO) or mixtures of MgO and CaO. Refractory adhesives which contain the aforementioned ingredients must be formulated with a binder system so that the adhesive composition has a sufficient viscosity for application to the surfaces being joined or for application to fill cracks, gaps or spaces or for use as a patch to repair defects. In addition, such a binder should be capable of quickly setting for the formation of a bond having adequate green strength to keep the refractory articles together. Also, the cement should develop a strong ceramic matrix bond upon firing so that the objects become permanently bonded.

At present, ceramic based refractory articles use aqueous mortar compositions with alkali silicate and alkali phosphate binders. However, the hydratable nature of calcined dolomite, MgO and combinations of MgO and CaO makes these materials unsuitable for use with a binder containing water.

Non-aqueous binder systems are known for use with articles made out of doloma or magnesia and related refractories. However, these articles, such as bricks, refractory casting molds and the like are not formulated for use as an adhesive or fillet composition. In particular, these types of compositions which are used for making bricks, casting molds, etc., are required to have certain physical characteristics which make them unsuitable for use as an adhesive or filler. For example, bricks are desirably made with coarse particles size refractory grain and an amount of binder so that the composition can be compacted to form a fixed shape which is then fired to form the finished brick. In contrast, an adhesive composition is required to be in the form of a paste. When formulated into a paste, the adhesive composition may be packed in a caulking cartridge and extruded by means of a conventional caulking gun or may be trowelled or parged onto an existing refractory shaped article. Likewise, use of the composition as a filler requires the same type of paste consistency.

In addition to the above-discussed characteristics, a refractory adhesive composition should be air-dryable, i.e., the binder should harden or set upon exposure to air so that sufficient green strength develops for adhesively securing refractory articles together prior to firing.

Summary of the Invention

Figure 1:
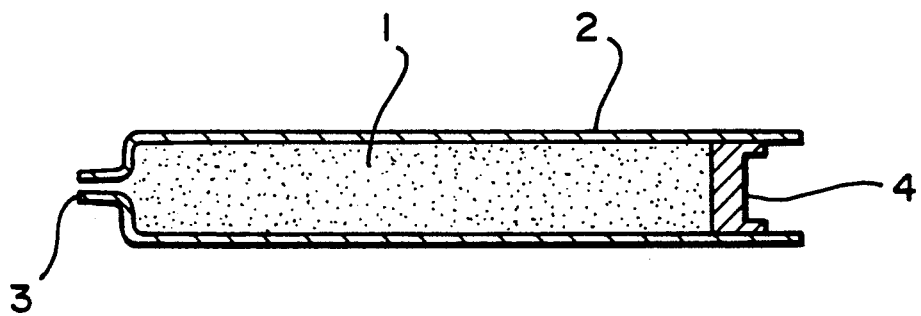
FIG. 1 illustrates a conventional caulking cartridge in which the present composition can be packaged.

It is an object of the present invention to provide a non-aqueous ceramic refractory adhesive, cement, filler or patch composition which can be easily extruded, trowelled or parged onto a shaped refractory article and which is air-settable and capable of forming a ceramic bond upon firing.

It is a further object of the present invention to provide a method for adhesively securing shaped refractory articles together with a refractory based cement composition.

It is a further object of the present invention to provide a method for filling cracks, gaps and spaces in refractory-shaped articles and for patching defects which develop in a refractory lining.

It is a further object of the present invention to provide a non-aqueous ceramic refractory adhesive, cement, filler or patch repair composition which is packaged in a caulking cartridge or flexible squeeze tube for application by extrusion.

These and other objects are achieved by formulating a blend of ceramic aggregate having a critical size limitation with an air-settable non-aqueous organic binder system. The aggregate is magnesia (MgO), doloma (e.g., calcined or dead-burned dolomite), a mixture of MgO and CaO or mixtures of these materials.

It has been discovered that in order for the composition to be useful as a ceramic mastic or filler, it should have a top particle size no coarser than about 16 mesh (Tyler) or 18 mesh (U.S. mesh). It is also important that a specific level of fineness be present to yield a product having the desired pliability and stickiness for use as an adhesive or filler, particularly for the purposes of extrusion through a conventional hand-operated caulking gun.

In particular, it has also been discovered that in order to achieve the above-desired utility, at least about 25% (by weight) of the aggregate particles should be no larger than 325 mesh (Tyler mesh screen; i.e., should pass through a 325 mesh (Tyler)). The above-mentioned particle size limitations are not only important for creating the desirable consistency which makes the product useful as an adhesive and filler. In addition, the above-mentioned particle size limitations also allows the composition to sinter rapidly for the formation of a monolithic ceramic matrix bond. The rapid formation of such a bond is important for use as a cement or filler material.

In order to avoid hydration of the MgO and CaO, the composition is formulated with a non-aqueous air-settable binder to avoid the problems associated with alkali silicate and alkali phosphate binders which contains water. In addition, the air-settable nature of the binder system utilized in the present invention allows the composition to form an air set bond having sufficient green strength to keep the shaped refractory articles together and to retain the composition in the cracks, gaps and the like without any special treatment steps, until the formation of a ceramic bond is formed upon firing.

The binder system employs an unsaturated drying oil. Such oils, such as tung oil and linseed oil, are well known. These oils form a solid matrix upon oxidative reaction with air due to oxygen cross-linking which takes place in the presence of air.

The composition may also include an organic solvent for use as a thinner and/or extender. When a volatile solvent is present, the binder system will harden due to a combination of solvent evaporation and oxygen cross-linking (oxygen polymerization) of the binder. Although it is preferable to form an air set bond prior to the formation of the ceramic bond, especially in instances where it is desirable to retain the shaped refractories in place prior to the formation of the final ceramic bond, it is not necessary to first form an air set bond. Thus, the composition may be heated to form a ceramic bond before or after an air set has been established. Upon heating to at least 700° F., a ceramic bond will develop and this ceramic bond will secure the compound to surrounding materials.

It has also been discovered that the composition can be improved by the incorporation of additives such as rheological modifiers. For example, the composition is desirably formulated with clay, such as bentonite clay (e.g., preferably hectorite) and fumed silica.

It has also been discovered that in a preferred embodiment, the ceramic bond strength is greatly improved if the composition includes a small amount of LiF.

The amount of liquid additive, such as thinner and extender, can be varied from about 5% to about 50% by weight in order to control the final viscosity of the composition. The consistency of the composition makes it useful for packaging in a conventional tubular caulking cartridge for application by extrusion. Such cartridges are well-known for use with other types of air setting caulking compositions such as silicone-based caulking compound.

The use of the above-mentioned air setting binder does not require the incorporation of chemically reactive curing agents to effect the initial hardening of the composition, as is required for other types of adhesives such as epoxy resins and the like which require a resin and hardener. Thus, the present invention avoids the need for separate packaging of chemically reactive materials in the binder.

DETAILED DESCRIPTION OF THE PREFERRED EMBODIMENT

The composition of the present invention contains refractory aggregate which is no coarser than 16 mesh (Tyler). In addition, at least 25% by weight of the refractory aggregate must be no coarser than 325 mesh (Tyler), i.e., must pass through a 325 mesh screen.

The refractory materials which are useful include calcined or dead-burned dolomite which is a mixture of CaO and MgO. Pure calcined dolomite may be used as the aggregate. Alternatively, the aggregate may be limited to pure MgO (magnesia or calcined magnesite). Mixtures of calcined dolomite and MgO may also be used. Thus, the composition may contain any proportion of calcined dolomite and MgO as well as mixtures of CaO and MgO. Suitable sources of MgO include the mineral periclase.

The binder includes a drying oil which is preferably tung oil or linseed oil. Also, it is desirable to combine the tung oil or linseed oil with a vinyl toluene/vegetable oil copolymer. The vinyl toluene/vegetable oil copolymer may be formulated with a hydrocarbon solvent such as naphtha. The vinyl toluene/vegetable oil copolymer is curable by oxidation. Conventional metallic dryers may be present to enhance oxidation. A suitable vinyl toluene/vegetable oil copolymer in a naphtha solvent is available from Reichhold Chemicals, Inc., Coating Polymers & Resin Division, Post Office Box 13582, Research Triangle Park, N.C. under the trade name "KELTRON ® 1074." "KELTRON ® 1074" has the following physical characteristics:

| KELTROL ® 1074 SPECIFICATIONS | |
|---|---|
| Percent Solids, Weight | 59–61 |
| Vicosity @ 25° C. | |
| Stokes | 16.7–28.0 |
| Gardner-Holdt | Z ± 1B approx. |
| Color, Gardner | 4 max. |
| Pounds/Gallon, solvent | 7.35–7.45 |
| Specific Gravity, 25/25° C. | 0.89 approx. |
| Pounds/Gallon, solids | 8.15 approx. |
| Acid Value, on solids | 6.7 max. |
| Solvent | VM & P Naphta (Exempt) |

Any commercially-available varnish, which includes the above-mentioned vinyl toluene-vegetable oil copolymer or similar resin, may be used in the binder of the present invention. For example, varnish sold under the trade name "PARKS Varnish" is suitable since it contains vinyl toluene/vegetable oil copolymer as a primary resin component. In addition, the "PARKS Varnish" is suitable due to its high naphtha content.

The binder may contain organic solvents such as naphtha and fuel oil, especially number 2 fuel oil. The solvent content may be varied from about 5% to about 50% by weight in order to change the final viscosity of the composition. In a preferred embodiment, the composition contains a small amount of clay and fumed silica. Also, in a preferred embodiment, a small amount of LiF is added. The incorporation of LiF into the composition results in enhanced strength. It has been observed that in the absence of LiF, the fired ceramic material is only one-third as strong in comparison to the same material formulated with LiF. An increase in the ceramic bond strength is observed when the composition contains at least about 0.10 by weight of LiF. A more significant increase in the ceramic bond strength is achieved when the composition contains at least about 0.2% LiF. Larger amounts of LiF may be added. However, amounts of LiF in excess of 0.2% by weight do not appreciably increase the bond strength beyond that achievable through the use of about 0.2% LiF. Thus, it is preferably to use about 0.2% by weight of LiF.

There is no critical method to formulate the composition. When formulating the composition, it is only necessary to mix the ingredients by hand or by means of conventional mixing devices to obtain a uniform blend.

The following examples illustrate preferred embodiments of the invention. In each example, the listed ingredients were mixed to form a uniform blend.

| EXAMPLE I | |
|---|---|
| −60 mesh (Tyler) periclase (MgO) | 40% by weight |
| BMF (ball milled fines) calcined dolomite | 40% by weight |
| Clay (Bentonite) | 1.65% by weight |
| Fumed SiO$_2$ | 1.5% by weight |
| LiF | 0.2% by weight |

EXAMPLE I -continued

| | |
|---|---|
| #2 fuel oil | 4% by weight |
| "PARKS Varnish" | 8% by weight |
| Tung oil | 4.7% by weight |

EXAMPLE II

| | |
|---|---|
| −60 mesh (Tyler) periclase (MgO) | 40% by weight |
| BMF (ball milled fines) periclase (MgO) | 35% by weight |
| BMF calcined dolomite | 5% by weight |
| Clay (Bentonite) | 1.6% by weight |
| Fumed SiO$_2$ | 1.5% by weight |
| LiF | 0.2% by weight |
| #2 fuel oil | 4% by weight |
| "PARKS Varnish" | 8% by weight |
| Tung oil | 4.7% by weight |

The composition of the present invention is particularly useful to join shaped refractory articles together. For example, shaped refractory members may be adhesively secured to a refractory tundish lining to form dams, weirs and baffles therein. In practice, the composition is applied to at least one of the surfaces being joined and then the shaped members are joined together through the adhesive which may then be allowed to air set before firing. Next, the tundish with the shaped member in place, is subjected to a ceramic bonding temperature which is preferably at least about 700° F. This heat treatment causes the formation of a ceramic bond. The composition may be applied by any suitable method including extrusion, trowelling or parging. In a preferred embodiment, the adhesive composition is extruded onto the surface or surfaces to be secured by means of a caulking gun.

A similar procedure is used when the composition is used to fill cracks, spaces or gaps in a shaped refractory article or when using the composition to patch a damaged shaped refractory article. In such procedures, the composition is applied to fill the cracks, spaces or gaps or is applied as a patch to the damaged portion of the shaped article. Suitable methods of application include extrusion, trowelling and parging. Finally, the composition is heated to the curing temperature to form a ceramic bond either before or after air-setting of the binder.

The composition is most useful with shaped refractory materials made from MgO and mixtures of MgO and CaO (including doloma). The composition may be effectively used wherever doloma or MgO-based cements are currently used.

As a result of the unique properties of the present composition, it may be easily packaged in a pre-mixed state in a single package such as a tubular caulking tube or flexible squeeze tube such as a tube used for pasty materials like toothpaste, glue and caulking compounds. In a preferred embodiment, the composition is premixed and packed in a sealed caulking tube as shown in FIG. 1. In FIG. 1, the pre-mixed composition 1 is contained in tube 2. The composition is extruded through nozzle 3 by pressure which is developed when plunger 4 is moved against the composition in a direction toward the nozzle.

The pre-mixed composition may also be conveniently packaged in a flexible tube which is closed at one end and which has an orifice at the other end for extrusion therethrough by the application of pressure on the flexible tube.

While the invention has been described in terms of certain preferred embodiments and exemplified with respect thereto, it should be understood that changes and modifications may be made without departing from the scope of the appended claims.

What is claimed is:

1. A non-aqueous Magnesium or Calcium containing refractory composition in the form of an extrudable paste for use as an adhesive or filler; said composition comprising refractory grain particles, a liquid unsaturated drying oil reactable with oxygen for forming an air set bond when exposed to air, a hydrocarbon solvent for said drying oil; said refractory grain particles being no larger than 16 Tyler mesh size with at least 25% by weight of the particles being no larger than 325 Tyler mesh size; and said drying oil and solvent being present in an amount to form a paste.

2. The composition of claim 1 wherein the refractory grain is selected from the group consisting of doloma, CaO, MgO and mixtures thereof.

3. The composition of claim 2 wherein the drying oil is selected from the group consisting of tung oil and linseed oil.

4. The composition of claim 3 wherein the hydrocarbon solvent is naphtha.

5. The composition of claim 4 which further includes vinyl toluene/vegetable oil copolymer.

6. The composition of claim 5 which further includes #2 fuel oil as an extender.

7. The composition of claim 6 which further includes clay and fumed silica.

8. The composition of claim 7 which further includes LiF.

9. The composition of claim 8 wherein the total amount of refractory grain is about 80% by weight.

10. A method for adhesively securing shaped refractory articles together which comprises applying the composition of claim 1 between the shaped articles being joined so that the composition is in contact with the surface of each article being joined; hardening the composition by evaporating at least a portion of the hydrocarbon solvent and exposing the composition to air; and then heating the composition to at least about 700° F. to form a ceramic bond which joins the articles together.

11. The method of claim 10 wherein the composition is applied by means of extrusion, trowelling or parging.

12. The method of claim 11 wherein the composition is applied by extrusion.

13. A method for filling cracks, spaces and gaps in a refractory material which comprises the steps of filling said cracks, gaps or spaces with the composition of claim 1 and then heating the composition to at least about 700° F. to form a ceramic bond.

14. A method for repairing damaged refractory shaped articles which comprises applying the composition of claim 1 to the damaged portion of the article and then firing the article at a temperature of at least about 700° F. to form a ceramic bond.

* * * * *